(12) United States Patent
Mikulica et al.

(10) Patent No.: US 10,634,379 B2
(45) Date of Patent: Apr. 28, 2020

(54) ACTUATORS WITH CONDITION TRACKING

(71) Applicant: Honeywell International Inc., Morris Plains, NJ (US)

(72) Inventors: Miroslav Mikulica, Brno (CZ); Lubos Sikora, Brno (CZ); Frantisek Krivanek, Brno (CZ); David Zeman, Vyskov (CZ)

(73) Assignee: Honeywell International Inc., Morris Plains, NJ (US)

( * ) Notice: Subject to any disclaimer, the term of this patent is extended or adjusted under 35 U.S.C. 154(b) by 239 days.

(21) Appl. No.: 15/719,517

(22) Filed: Sep. 28, 2017

(65) Prior Publication Data

US 2019/0093913 A1  Mar. 28, 2019

(51) Int. Cl.
| | |
|---|---|
| *H02K 11/25* | (2016.01) |
| *H02K 11/27* | (2016.01) |
| *F24F 11/38* | (2018.01) |
| *F24F 11/63* | (2018.01) |
| *F24F 11/70* | (2018.01) |
| *F24F 11/56* | (2018.01) |
| *F24F 11/88* | (2018.01) |
| *H02K 11/35* | (2016.01) |
| *G05B 15/02* | (2006.01) |
| *F24F 140/50* | (2018.01) |
| *F24F 110/10* | (2018.01) |
| *F24F 110/20* | (2018.01) |
| *F24F 110/40* | (2018.01) |
| *F24F 140/10* | (2018.01) |

(52) U.S. Cl.
CPC .............. *F24F 11/38* (2018.01); *F24F 11/56* (2018.01); *F24F 11/63* (2018.01); *F24F 11/88* (2018.01); *G05B 15/02* (2013.01); *H02K 11/25* (2016.01); *H02K 11/27* (2016.01); *H02K 11/35* (2016.01); *F24F 11/70* (2018.01); *F24F 2110/10* (2018.01); *F24F 2110/20* (2018.01); *F24F 2110/40* (2018.01); *F24F 2140/10* (2018.01); *F24F 2140/50* (2018.01); *G05B 2219/2614* (2013.01); *G05B 2219/2642* (2013.01)

(58) Field of Classification Search
CPC . G05B 15/02; F24F 11/38; F24F 11/63; F24F 11/70; H02K 11/25; H02K 11/27
See application file for complete search history.

(56) References Cited

U.S. PATENT DOCUMENTS

| | | |
|---|---|---|
| 5,493,191 A | 2/1996 | Phoy et al. |
| 5,519,295 A | 5/1996 | Jatnieks |
| 6,249,100 B1 | 6/2001 | Lange |
| 7,603,222 B2 | 10/2009 | Wisemann et al. |

(Continued)

*Primary Examiner* — Mohamed Charioui
(74) *Attorney, Agent, or Firm* — Seager Tufte & Wickhem LLP

(57) ABSTRACT

An actuator may include a drive motor, an actuatable output, and a sensor for sensing a first sensed parameter in or around the actuator. The first sensed parameter may have a first sensed parameter value that can change with time. The actuator may also include electronics that may identify a first identified value representative of the first sensed parameter value and increment a first counter value when the first identified value falls within a first range of values, and increment a second counter value when the first identified value falls within a second range of values.

34 Claims, 19 Drawing Sheets

(56) References Cited

U.S. PATENT DOCUMENTS

| | | | |
|---|---|---|---|
| 8,084,982 B2 | 12/2011 | Grabinger et al. | |
| 8,838,413 B2 * | 9/2014 | Genta | G05B 23/00 |
| | | | 702/179 |
| 9,372,482 B2 | 6/2016 | Rikkola et al. | |
| 9,441,547 B2 | 9/2016 | Cai et al. | |
| 9,766,638 B2 * | 9/2017 | Georgin | H02P 6/18 |
| 10,112,727 B1 * | 10/2018 | Cutler | B64F 5/60 |
| 2004/0030531 A1 | 2/2004 | Miller et al. | |
| 2006/0016201 A1 * | 1/2006 | Kopel | G01K 13/00 |
| | | | 62/129 |
| 2007/0118270 A1 | 5/2007 | Wiseman et al. | |
| 2011/0076131 A1 | 3/2011 | Stabley et al. | |
| 2014/0277764 A1 | 9/2014 | Burt | |
| 2015/0323928 A1 * | 11/2015 | Yim | G05B 23/00 |
| | | | 702/183 |
| 2017/0152862 A1 | 6/2017 | Houst et al. | |
| 2017/0293293 A1 | 10/2017 | Brownie et al. | |

\* cited by examiner

| Actuator Temp. (°C) ~202 | Identified Temperature (1ms) ~204 | Avg. Temp. (1s) ~206 | Counter Value ~208 |
|---|---|---|---|
| 65-51 | - | - | 0 |
| 50-36 | - | - | 0 |
| 35-11 | 34.9 | - | 0 |
| 10-(-5) | - | - | 0 |
| (-4)-(-14) | - | - | 0 |
| (-15)-(-25) | - | - | 0 |
| (-26)-(-40) | - | - | 0 |

Fig. 2A

| Actuator Temp. (°C) ⌐202 | Identified Temperature (1ms) ⌐204 | Avg. Temp. (1s) ⌐206 | Counter Value ⌐208 |
|---|---|---|---|
| 65-51 | - | - | 0 |
| 50-36 | 36.1,36.2 | - | 0 |
| 35-11 | 34.9,35.1,35.6,35.8,35.9,35.4,34.9,34.8 | - | 0 |
| 10-(-5) | - | - | 0 |
| (-4)-(-14) | - | - | 0 |
| (-15)-(-25) | - | - | 0 |
| (-26)-(-40) | - | - | 0 |

Fig. 2B

| Actuator Temp. (°C) ⌐202 | Identified Temperature (1ms) ⌐204 | Avg. Temp. (1s) ⌐206 | Counter Value ⌐208 |
|---|---|---|---|
| 65-51 | - | - | 0 |
| 50-36 | 36.1,36.2 | - | 0 |
| 35-11 | 34.9,35.1,35.6,35.8,35.9,35.4,34.9,34.8 | 34.6 | 1 |
| 10-(-5) | - | - | 0 |
| (-4)-(-14) | - | - | 0 |
| (-15)-(-25) | - | - | 0 |
| (-26)-(-40) | - | - | 0 |

Fig. 2C

| Actuator Temp. (°C) ~202 | Identified Temperature (1ms) ~204 | Avg. Temp. (1s) ~206 | Counter Value ~208 |
|---|---|---|---|
| 65-51 | - | - | 0 |
| 50-36 | 36.1,36.2 | 36.3,37.2,38.3,39.7... | 23119 |
| 35-11 | 34.9,35.1,35.6,35.8,35.9,35.4,34.9,34.8 | 34.6,34.1,35.3,35.6... | 63281 |
| 10-(-5) | - | - | 0 |
| (-4)-(-14) | - | - | 0 |
| (-15)-(-25) | - | - | 0 |
| (-26)-(-40) | - | - | 0 |

Fig. 2D

| Actuator Temp. (°C) | Identified Temperature (1ms) | Avg. Temp. (1s) | Counter Value |
|---|---|---|---|
| 65-51 | - | - | 1503436 |
| 50-36 | 36.1,36.2 | 36.3,37.2,38.3,39.7.... | 3964600 |
| 35-11 | 34.9,35.1,35.6,35.8,35.9,35.4,34.9,34.8 | 34.6,34.1,35.3,35.6... | 5952800 |
| 10-(-5) | - | - | 1611725 |
| (-4)-(-14) | - | - | 1389320 |
| (-15)-(-25) | - | - | 926213 |
| (-26)-(-40) | - | - | 463106 |

Fig. 2E

| Load Current (mA) | Identified Current (1ms) | Avg. Current (1s) | Counter Value |
|---|---|---|---|
| 0-29 | - | - | 0 |
| 30-39 | - | - | 0 |
| 40-49 | - | - | 0 |
| 50-59 | 57.2,58.7,58.9 | - | 0 |
| 60-69 | 61.3,63.5,67.7,68.5 | - | 0 |
| 70-79 | 70.3,70.6,70.2 | - | 0 |
| 80-89 | - | - | 0 |
| 90-100 | - | - | 0 |

Fig. 3B

| Load Current (mA) | Identified Current (1ms) | Avg. Current (1s) | Counter Value |
|---|---|---|---|
| 0-29 | - | - | 0 |
| 30-39 | - | - | 0 |
| 40-49 | - | - | 0 |
| 50-59 | 57.2,58.7,58.9 | - | 0 |
| 60-69 | 61.3,63.5,67.7,68.5 | 67.3 | 1 |
| 70-79 | 70.3,70.6,70.2 | - | 0 |
| 80-89 | - | - | 0 |
| 90-100 | - | - | 0 |

Fig. 3C

| Load Current (mA) | Identified Current (1ms) | Avg. Current (1s) | Counter Value |
|---|---|---|---|
| 0-29 | - | - | 0 |
| 30-39 | - | - | 0 |
| 40-49 | - | - | 0 |
| 50-59 | 57.2,58.7,58.9 | 55.6,56.1,57.2,57.1 | 30246 |
| 60-69 | 61.3,63.5,67.7,68.5 | 67.3,66.4,68.1,67.9 | 53724 |
| 70-79 | 70.3,70.6,70.2 | 72.3,73.5,76.1,75.9 | 12430 |
| 80-89 | - | - | 0 |
| 90-100 | - | - | 0 |

Fig. 3D

| Load Current (mA) | Identified Current (1ms) | Avg. Current (1s) | Counter Value |
|---|---|---|---|
| 0-29 | - | - | 384212 |
| 30-39 | - | - | 723893 |
| 40-49 | - | - | 1224639 |
| 50-59 | 57.2,58.7,58.9 | 55.6,56.1,57.2,57.1 | 3865312 |
| 60-69 | 61.3,63.5,67.7,68.5 | 67.3,66.4,68.1,67.9 | 4836230 |
| 70-79 | 70.3,70.6,70.2 | 72.3,73.5,76.1,75.9 | 3264977 |
| 80-89 | - | - | 1083196 |
| 90-100 | - | - | 428741 |

| Load Current (mA) | 0-29 | 30-39 | 40-49 | 50-59 | 60-69 | 70-79 | 80-89 | 90-100 |
|---|---|---|---|---|---|---|---|---|
| -40°C to -26°C | 300 | 4500 | 18750 | 37500 | 15000 | 1125 | 600 | 750 |
| -25°C to -15°C | 1125 | 11250 | 22500 | 52500 | 37500 | 2475 | 900 | 1500 |
| -14°C to -5°C | 4500 | 45000 | 90000 | 210000 | 150000 | 9900 | 3600 | 3750 |
| -4°C to 10°C | 12500 | 87500 | 112500 | 225000 | 137500 | 100000 | 37500 | 12500 |
| 11°C to 35°C | 37500 | 262500 | 337500 | 375000 | 412500 | 300000 | 112500 | 37500 |
| 36°C to 50°C | 18750 | 131250 | 168750 | 187500 | 206250 | 150000 | 56250 | 18750 |
| 51°C to 65°C | 9370 | 65625 | 84375 | 93750 | 103125 | 75000 | 28125 | 9375 |
| Total | 84050 | 607625 | 834375 | 1181250 | 1061875 | 638500 | 239475 | 84125 |

Fig. 4

| Motor current | 0-29 | 30-39 | 40-49 | 50-59 | 60-69 | 70-79 | 80-89 | 90-100 | Stall Open | Stall Close |
|---|---|---|---|---|---|---|---|---|---|---|
| -40°C to -26°C | 300 | 4500 | 18750 | 37500 | 15000 | 1125 | 600 | 750 | 375 | 375 |
| -25°C to -15°C | 1125 | 11250 | 22500 | 52500 | 37500 | 2475 | 900 | 1500 | 1875 | 1875 |
| -14°C to -5°C | 4500 | 45000 | 90000 | 210000 | 150000 | 9900 | 3600 | 3750 | 15000 | 15000 |
| -4°C to 10°C | 12500 | 87500 | 112500 | 225000 | 137500 | 100000 | 37500 | 12500 | 45000 | 45000 |
| 11°C to 35°C | 37500 | 262500 | 337500 | 375000 | 412500 | 300000 | 112500 | 37500 | 9000 | 9000 |
| 36°C to 50°C | 18750 | 131250 | 168750 | 187500 | 206250 | 150000 | 56250 | 18750 | 4500 | 4500 |
| 51°C to 65°C | 9370 | 65625 | 84375 | 93750 | 103125 | 75000 | 28125 | 9375 | 2250 | 2250 |
| Total | 84050 | 607625 | 834375 | 1181250 | 1061875 | 638500 | 239475 | 84125 | 78000 | 78000 |

Timing 90
506 — Total Cycles 54303

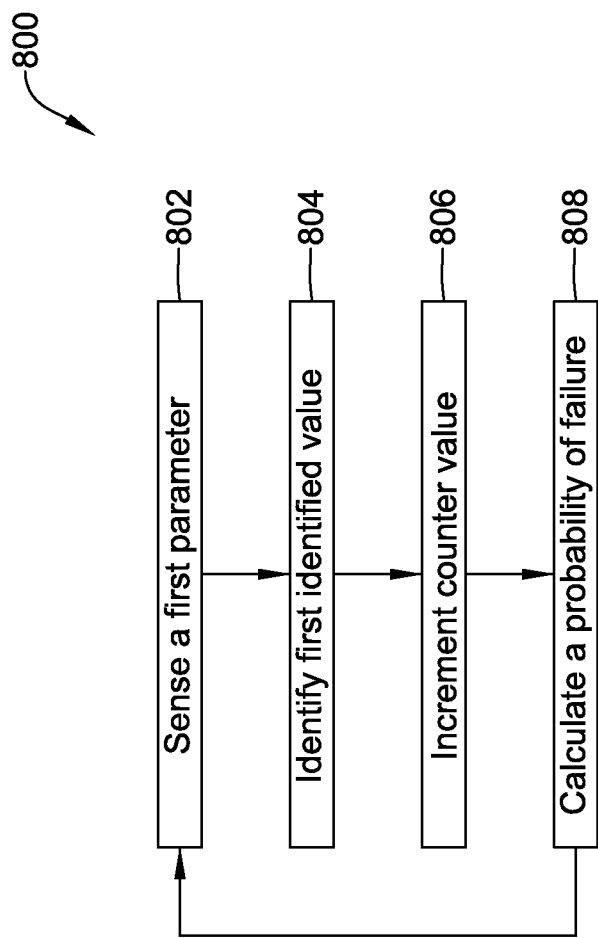

ACTUATORS WITH CONDITION TRACKING

TECHNICAL FIELD

The disclosure relates generally to building automation systems, and more particularly to actuators for building automation systems.

BACKGROUND

Building automation systems can include building control systems such as a Heating, Ventilation and/or Air Conditioning (HVAC) system, a security/access control system, a lighting system, a fire system and/or other building control system of a building. Many such building control systems include one or more mechanical actuators for actuating a building component such as a valve, a damper, a door lock and/or other building component. Such actuators are often used until failure, and in some cases, such failure may go unnoticed for an extended period of time. During this time, the corresponding building control system may perform in a sub-optimal manner. For example, in an HVAC system, if a damper actuator that controls the flow of conditioned air to a zone of a building fails, the zone may become over-conditioned (e.g. the damper is stuck open) or under conditioned (e.g. the damper is stuck closed). This may lead to wasted energy and/or a reduction in occupant discomfort until the damper actuator failure is discovered and is replaced.

In some cases, a calendar based maintenance program may be established for each building component of a building automation system. A calendar based maintenance program typically dictates when each of the building component should be replaced based on a worst case scenario so that statistically the building components will be replaced before they fail. While such calendar based maintenance programs may be useful in maintaining the building control system, some of the building components will be replaced pre-maturely while others may fail before the indicated replacement date. In example, some mechanical actuators may not be actuated very often, and/or operated in a way or under operating conditions that allow the mechanical actuators to continue to operate for an extended period of time beyond that which is assumed by the calendar based maintenance program. Likewise, some mechanical actuators may be actuated very often, and/or operated in a way or under operating conditions that causes the mechanical actuators to fail before the date assumed by the calendar based maintenance program. The actual failure date of an actuator may depend on a variant of factors that are not considered by a calendar based maintenance program including for example, the particular building component in the building control system that is being controlled, the placement and/or actual operation of the mechanical actuator, the environmental conditions surrounding the mechanical actuator, as well as other factors.

What would be desirable is an actuator that tracks various local parameters over time, and then use those local parameters to determine an expected failure date for the particular actuator. The actuator may then be replaced before the expected date of failure.

SUMMARY

The disclosure describes systems, methods, and executable programs that allow an installer or other user to have more insight into the health or status of an actuator and allow a user to take the proper course of action so that a building control device of a building automation system may be replaced in a more optimal manner. This may be accomplished by having an actuator track various local parameters over time. These local parameters may then be used to determine an expected failure date for the particular actuator. The actuator may then be replaced before the expected date of failure.

In an example of the disclosure, an actuator for actuating a building control device of a building automation system may include a drive motor, an actuatable output coupled to and driven by the drive motor, and a first sensor for sensing a first sensed parameter in or around the actuator. The first sensed parameter may have a first sensed parameter value that can change with time. Electronics may be operatively coupled to the first sensor and may be configured to repeatedly identify a first identified value representative of the first sensed parameter value and for each first identified value, the electronics may increment a first counter value when the first identified value falls within a first range of values, and may increment a second counter value when the first identified value falls within a second range of values, wherein the first range of values is different from the second range of values. Each of these counter values may then represent the amount of time that the first sensed parameter value was in the corresponding range of values.

In one concrete example, the first sensed parameter value may be a temperature in or around the actuator. A range of temperature values (e.g. −50 F to 125 F) may be divided into a plurality of ranges of values (e.g. each range of values being 5F, resulting in 35 ranges of values). A counter may be assigned to each range of values (e.g. 35 counters). Then, during operation, a measure of temperature may be determined every minute, and the counter corresponding to the range of values that corresponds to the measure of temperature may be incremented. This may be repeated over time. The resulting counter values may then represent a histogram of the temperature history in or around the actuator. This data may be used to help predict when the actuator will fail.

It is contemplated that this may be carried out for multiple sensed parameter values, and the resulting data may be used to help better predict when the actuator will fail. According to various embodiments, the sensed parameter values may be indicative of the status of the surroundings or environment of the actuator and/or the state or operating status of the actuator itself. For example, in some cases, the sensed parameter values may include the operational load current of the actuator, the internal temperature of the actuator, the temperature surrounding the actuator, the humidity levels surrounding the actuator, the atmospheric pressure surrounding the actuator, the differential pressure associated with the operation of the actuator (e.g. a damper actuator), the speed and direction of the air surrounding the actuator, the quality of the air surrounding the actuator, the number of actuator openings, the number of actuator closings, the number of actuator stalls, the speed of the actuator at each stall, etc. These are just some examples.

Alternatively or additionally to the foregoing, the electronics may be configured to identify a first identified value representative of the first sensed parameter value at a first predetermined rate.

Alternatively or additionally to any of the embodiments above, the electronics may be configured to sample a first sensor for the first sensed parameter value at a second predetermined rate, wherein the second predetermined rate is faster than the first predetermined rate.

Alternatively or additionally to any of the embodiments above, the electronics may be configured to identify a first identified value by averaging the first sensed parameter values that have been sampled since the last first identified value was identified.

Alternatively or additionally to any of the embodiments above, the electronics may be configured to identify a first identified value by selecting one of the first sensed parameter values that have been sampled since the last first identified value was identified.

Alternatively or additionally to any of the embodiments above, the first identified value representative of the first sensed parameter value may be the first sensed parameter value.

Alternatively or additionally to any of the embodiments above, further comprising a second sensor for sensing a second sensed parameter in or around the actuator, wherein the second sensed parameter has a second sensed parameter value that can change with time, and the electronics may be further configured to repeatedly identify a second identified value representative of the second sensed parameter value, and for each first identified value, may increment a third counter value when the second identified value falls within a third range of values, and may increment a fourth counter value when the second identified value falls within a fourth range of values, wherein the third range of values may be different from the fourth range of values.

Alternatively or additionally to any of the embodiments above, the first sensor may be a temperature sensor, and the second sensor is a load current sensor.

Alternatively or additionally to any of the embodiments above, further comprising a transmitter for transmitting the first counter value and the second counter value to a remote device.

Alternatively or additionally to any of the embodiments above, the electronics may be further configured to calculate a probability of failure of the actuator based at least in part on the first counter value and the second counter value.

Alternatively or additionally to any of the embodiments above, further comprising a receiver for receiving a failure model from a remote device, wherein the electronics may be configured to use the failure model to calculate the probability of failure of the actuator.

Alternatively or additionally to any of the embodiments above, the electronics may be further configured to increment a stall counter for maintaining a count of a number of stalls experienced by the actuator.

Alternatively or additionally to any of the embodiments above, the electronics may be further configured to increment a cycle counter for maintaining a count of a number of open/close cycles and/or number of position changes of the actuatable output experienced by the actuator.

In another example of the disclosure, an actuator for actuating a building control device of a building automation system may comprise a drive motor, an actuatable output coupled to and driven by the drive motor, a first sensor for sensing a first sensed parameter in or around the actuator, wherein the first sensed parameter may have a first sensed parameter value that can change with time, a second sensor for sensing a second sensed parameter in or around the actuator, wherein the second sensed parameter may have a second sensed parameter value that can change with time, and electronics operatively coupled to the first sensor and the second sensor. The electronics may be configured to repeatedly identify a first identified value representative of the first sensed parameter value, repeatedly identify a second identified value representative of the second sensed parameter value, increment a first counter value when the first identified value falls within a first range of values and the second identified value falls within a second range of values, increment a second counter value when the first identified value falls within a third range of values and the second identified value falls within the second range of values, increment a third counter value when the first identified value falls within the first range of values and the second identified value falls within a fourth range of values, and increment a fourth counter value when the first identified value falls within the second range of values and the second identified value falls within the fourth range of values.

Alternatively or additionally to any of the embodiments above, the electronics may be configured to identify a first identified value representative of the first sensed parameter value, identify a second identified value representative of the second sensed parameter value, and increment the first, second, third and fourth counter values, as appropriate, at a predetermined rate.

Alternatively or additionally to any of the embodiments above, the first sensor may be a temperature sensor, and the second sensor may be a load current sensor.

Alternatively or additionally to any of the embodiments above, further comprising a transmitter for transmitting the first counter value, the second counter value, the third counter value and the fourth counter value to a remote device.

Alternatively or additionally to any of the embodiments above, the electronics may be further configured to calculate a probability of failure of the actuator based at least in part on the first counter value, the second counter value, the third counter value and the fourth counter value.

Alternatively or additionally to any of the embodiments above, further comprising a receiver for receiving a failure model from a remote device, wherein the electronics may be configured to use the failure model to calculate the probability of failure of the actuator.

In another example of the disclosure, a method for estimating a probability of failure of an actuator may comprise sensing a first sensed parameter in or around the actuator, wherein the first sensed parameter may have a first sensed parameter value that can change with time. Repeatedly identifying a first identified value representative of the first sensed parameter value. For each first identified value, incrementing a first counter value when the first identified value falls within a first range of values, and incrementing a second counter value when the first identified value falls within a second range of values, wherein the first range of values may be different from the second range of values. A probability of failure of the actuator is then calculated based at least in part on the first counter value and the second counter value.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which:

FIGS. 2A-2E show an exemplary counter table over time;

FIG. 3A-3E show another exemplary counter table over time;

FIG. 4 shows an exemplary two-dimensional counter table;

FIG. 8 is a flow diagram of an illustrative method.

Figure 1:
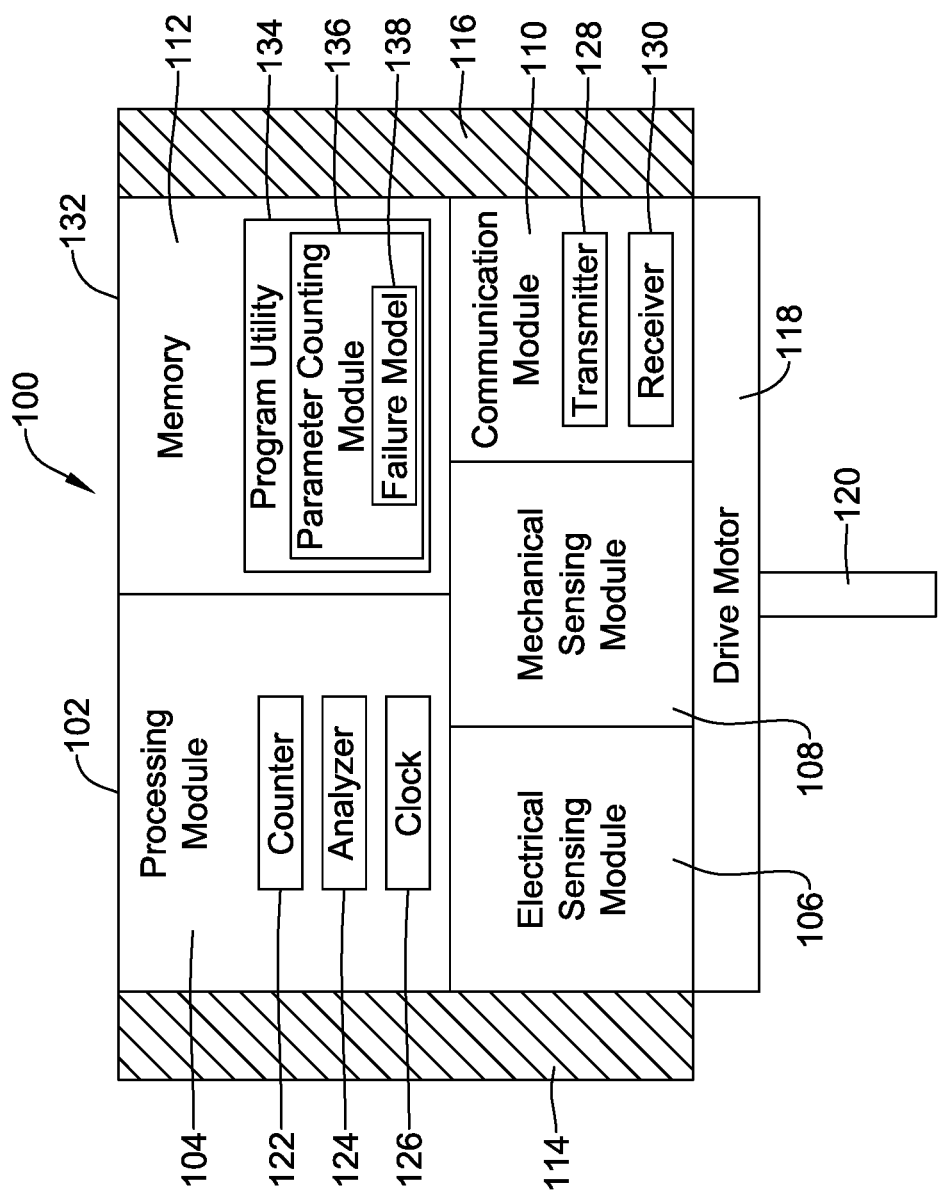
FIG. 1 is a schematic block diagram of an illustrative actuator.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure.

Certain embodiments of the present disclosure may be found in a system, a method, and/or a non-transitory computer-readable storage medium with an executable program stored thereon for implementing parameter collection operations to obtain information regarding actuators used in building control devices. In various embodiments, controller (s) may be configured to direct the operation of actuators included with and/or in building control devices of a building automation system located in or around a building. By collecting the various parameters over time, insight into the performance of specific actuators and descriptions of the status of the actuators may be obtained. In some cases, this data may be used to determine an expected failure date for each actuator, and as such the actuators may be replaced before the expected date of failure.

FIG. 1 depicts an illustrative actuator 100 that may be used in conjunction with building control devices in a building automation system. While a building control actuator is used as an example, it is contemplated that the present disclosure may be applied to any suitable actuator, including automotive actuators, process control actuators, and other actuators. As shown, the actuator 100 includes electronics 102, housing 132, sensors 114, 116, a drive motor 118, and an actuatable output 120. In some cases, the electronics 102 may respond to an output signal from a remote controller (not shown in FIG. 1) and use the drive motor 118 to provide the mechanical action to move the actuatable output 120 that then operates a mechanism (e.g., a valve or damper) of a building control device. In some cases, the electronics 102 may include a processing module 104, an electrical sensing module 106, a mechanical sensing module 108, a communications module 110, and memory 112. It is contemplated that the electronics 102 may include more or less modules than those shown in FIG. 1, depending on the application.

The electrical sensing module 106 may be configured to sense one or more parameters in or around the actuator 100. In some examples, the parameters may include electrical activity associated with the actuator 100 and the electrical sensing module 106 may include one or more sensors to detect the electrical activity, such as at the terminals of the actuator 100 and/or elsewhere in the electronics 102. For example, the electrical sensing module 106 may be connected to the sensors 114, 116 and the electrical sensing module 106 may be configured to sense the parameters (e.g. load current, load voltage, signal degradation, etc.) within or surrounding the actuator 100 via the sensors 114, 116.

In some examples, the mechanical sensing module 108, may be configured to sense one or more parameters in or around the actuator 100. For example, in certain embodiments, the mechanical sensing module 108 may include one or more sensors, such as a temperature sensor, an accelerometer, a pressure sensor, a humidity sensor, an air flow or velocity sensor, a chemical sensor (e.g. air quality sensor), and/or any other suitable sensor that is configured to detect one or more mechanical/chemical parameters in or around the actuator 100. Both the electrical sensing module 106 and the mechanical sensing module 108 may be connected to the processing module 104 and provide signals representative of the sensed parameter(s). Although described with respect to FIG. 1 as separate sensing modules, in some cases, the electrical sensing module 106 and the mechanical sensing module 108 may be combined into a single sensing module, as desired.

According to various embodiments, the parameters may be indicative of the status of the surroundings or environment of the actuator 100 and/or the state or operating status of the actuator 100 itself. For example, in some cases, the parameters may include the operational load current of the actuator 100, the internal temperature of the actuator 100, the temperature surrounding the actuator 100, the humidity levels surrounding the actuator 100, the atmospheric pressure surrounding the actuator 100, the differential pressure associated with the operation of the actuator 100 (e.g. a damper actuator), the speed and/or direction of the air surrounding the actuator 100, the quality of the air surrounding the actuator 100, etc. In some cases, the status of the surroundings of the actuator 100 and/or the state of the actuator 100 may provide information relevant to helping to predict the operational lifetime of the actuator 100. In such cases, the parameters may be used to calculate a probability of failure of the actuator 100 over time.

In some cases, some of the illustrative sensors 114, 116 may be secured relative to the inside and/or outside of the housing 132 of the actuator 100 and may be exposed to the atmosphere inside and/or outside of the actuator 100. In some examples, the sensors 114, 116 may be in electrical communication with one or more of the modules 104, 106, 108, 110 and memory 112. The sensors 114, 116 may be supported by the housing 132. In some examples, the sensors 114, 116 may be connected to the housing 132 through short connecting wires such that the sensors 114, 116 are not directly secured relative to the housing 132 but rather located remotely from the housing. In some cases, the remote sensors 114, 116 may increase the number of electrodes by which the actuator 100 may sense parameters, and/or communicate with a remote device. In some examples, the sensors 114, 116 may be integrated with the electronics 102 (e.g., with the electrical sensing module 106 and the mechanical sensing module 108). In certain embodiments, where the sensors 114, 116 include temperature sensors, the sensors 114, 116 may include platinum resistance thermometers, thermistors, nickel resistance thermometers, etc. In certain embodiments, where the sensors 114, 116 include humidity sensors, the sensors 114, 116 may include capacitive sensors, dew point sensors, etc. In certain embodiments, where the sensors 114, 116 include pressure sensors, the sensors 114, 116 may include capacitive sensors, inductive sensors, strain gauge sensors, potentiometers, etc. In certain embodiments, where the sensors 114, 116 include velocity or flow sensors, the sensors 114, 116 may include pitot tubes, hot wire anemometers, orifice plates, turbine flow meters, etc. In certain embodiments, where the sensors 114, 116 include air quality sensors (e.g., gas sensors), the sensors 114, 116 may include $CO_2$ sensors, multi-gas sensors, specified pollutant sensors, obscuration sensors, etc. In some instances, the sensors 114, 116 connected to the actuator 100 may have an insulative portion that electrically isolates the sensors 114, 116 from adjacent sensors, the housing 132, and/or other parts of the actuator 100.

The processing module 104 may include electronics that are configured to control the operation of the actuator 100. The processing module 104 may further be configured to obtain electrical signals from the electrical sensing module 106 and/or the mechanical sensing module 108 indicative of parameter value(s). In some embodiments, the processing module may obtain the parameter value(s) at a set rate or rate(s) (e.g. predetermined sample rate) and measure the rates using a clock 126. The processing module 104 may use an analyzer block 124 to analyze or measure the signals to identify the parameter value(s). The processing module 104 may then use a counter block 122 to increment a counter value(s) based on the identified the parameter value(s). In some cases, the processing module 104 may be configured to instruct the communication module 110 to use a transmitter 128 to transmit the counter value(s) to remote devices (e.g., a controller, a server, over a network, etc.).

In some cases, the processing module 104 may be configured to use the analyzer block 124 to calculate a probability of failure of the actuator 100 over time and/or other actuators using the counter value(s). In some cases, the processing module 104 may instruct the communication module 110 to use receiver 130 to receive an actuator failure model 138 from a remote device (e.g., a controller, a server, over a network, etc.) and apply, compare, and/or measure the counter value(s) against the failure model 138 and obtain a probability of failure of the actuator 100 over time.

In some cases, the processing module 104 may receive electrical signals from the electrical sensing module 106 and/or the mechanical sensing module 108 indicative of the state of the actuatable output 120 and/or position value(s) of the actuatable output 120. The processing module 104 may use the analyzer block 124 to analyze the state of the actuatable output 120 to determine whether the actuatable output 120 has stalled and/or analyze the position value(s) to determine whether the actuatable output 120 is in an open/closed position or whether a positional change of the actuatable output 120 has occurred. The processing module 104 may use the counter block 122 to increment one or more counter value(s) based on the analysis of the state of the actuatable output 120 and/or position value(s).

In some examples, the processing module 104 may include a pre-programmed chip, such as a very-large-scale integration (VLSI) chip and/or an application specific integrated circuit (ASIC). In such embodiments, the chip may be pre-programmed with control logic in order to control the operation of the actuator 100. In some cases, the pre-programmed chip may implement a state machine that performs the desired functions. By using a pre-programmed chip, the processing module 104 may use less power than other programmable circuits (e.g. general purpose programmable microprocessors) while still being able to maintain basic functionality. In other examples, the processing module 104 may include a programmable microprocessor. Such a programmable microprocessor may allow a user to modify the control logic of the actuator 100 even when already installed, thereby allowing for greater flexibility of the actuator 100 than when using a pre-programmed ASIC.

The memory 112 of the actuator 100 may include volatile and/or non-volatile memory. The counter values are preferable stored in non-volatile memory so that the values are not lost if power is lost to the actuator. In some cases, program/utility 134 may be stored in the memory 112 and may include a set of application program modules (e.g. software), such as a parameter counter module 136. In some cases, the program/utility 134 may include additional program modules as well as an operating system, one or more other application program modules, and/or program data. According to various embodiments, the application program modules (e.g., the parameter counter module 136) may include an actuator failure model 138, for example. In certain embodiments, the parameter counter module 136, including the actuator failure model 138, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The parameter counter module 136 may execute on the actuator 100. In some cases, the parameter counter module 136 may execute on a remote device (e.g., a controller or server). In some cases, part of the parameter counter module 136 may be executed on the actuator 100 and part of the parameter counter module 136 may be executed on a remote device. In the latter scenario, the remote device may be connected to the communication module 110 of the actuator 100 through any type of network, including a local area network (LAN) or a wide area network (WAN), or the connection may be made to an external computer (for example, through the Internet using an Internet Service Provider). In certain embodiments, the communication module 110 may be configured to communicate with the remote device to receive and provide diagnostic information (e.g., counter value(s), the failure model 138, a probability of failure of the actuator 100) about the actuator 100 and/or other information regarding the actuator 100. For example, in some cases, the actuator 100 may receive a failure model 138 in the form of signals, data, commands or instructions and/or messages from a server of the building automation system through the receiver 130 of the communication module 110. The processing module 104 may then measure counter value(s) against the failure model 138 to determine a probability of failure of the actuator 100. The processing module 104 may then instruct the communication module 110 to use the transmitter 128 to send the probability of failure of the actuator 100 in the form of signals, data, commands or instructions and/or messages back to the server. The communication module 110 may be configured to use one or more methods for communicating with external devices. For example, the communication module 110 may communicate via wired communication, radiofrequency (RF) signals, optical signals, acoustic signals, and/or any other signals suitable for communication.

FIGS. 2A-2E show an exemplary counter table over time. As stated herein, an actuator (e.g., actuator 100, from FIG. 1) may use sensors (e.g., electrical sensors, temperature sensors, accelerometers, pressure sensors, humidity sensors, air flow or velocity sensors, chemical sensors, etc.) to continuously sense signals (which can include discretely sampled signals at a sample interval) to obtain parameters in or around the actuator. These parameters may be indicative of the status of the surroundings or environment of the actuator and/or the operating status of the actuator. Since the actuators surroundings and the actuators operating status may change over time, the parameters may also change over time. As such, in some cases, the actuator may repeatedly identify parameter values from the parameters at a specific rate or rates. The actuator may analyze the parameter values and increment corresponding counter values according to the analysis.

An exemplary counter table 200 is shown in FIG. 2A. In this example, the parameters are indicative of an internal actuator temperature (° C.). The output of a temperature sensor is continuously sensed (which can include discretely sampled signals at a sample interval) and the sensed temperature values are repeatedly identified. As shown, an actuator temperature range (° C.) 202 of −40 to 65 (° C.) has been subdivided into the following temperatures ranges: 65-51, 50-36, 35-11, 10-(−5), (−4)-(−14), (−15)-(−25), and (−26)-(−40). In this example, the rate at which signals are sensed (e.g. sampled) 202 is every 1 millisecond (ms). In other examples, the sample rate may be every 1 nanosecond (ns), 1 microsecond (μs), 1 second (s), 5 s, 10 s, 60 s, 1 minute, 10 minutes, 1 hour, 12 hours, 24 hours, and/or any other suitable time period. In certain embodiments, once the signal has been sensed (e.g. sample), the signal may be analyzed to identify the corresponding actuator temperature 202. For example, as shown in FIG. 2A, after the first millisecond, the sampled signal is analyzed and the identified temperature 204 is identified as 34.9° C. Since 34.9° C. falls within the range of 35-11, 34.9 is placed in the corresponding $3^{rd}$ row of the identified temperature column 204. Turning now to FIG. 2B, after which 10 ms have passed, ten actuator 10 temperatures have been identified. In this case, the temperatures 34.9, 35.1, 35.6, 35.8, 35.9, 35.4, 34.9, and 34.8 are identified and placed in the corresponding $3^{rd}$ row of the identified temperature column 204 and the temperatures 36.1, and 36.2 are identified and placed in the corresponding $2^{nd}$ row of the identified temperature column 204.

Turning now to FIG. 2C, in this example, the rate at which the identified temperatures 204 are averaged is every 1 second. In other examples, the rate may be every 1 ns, 1 μs, 1 ms, 5 s, 10 s, 60 s, 1 minute, 10 minutes, 1 hour, 12 hours, 24 hours, or any other suitable rate. In some cases, the identified temperatures 204 may not be averaged and the counter values 208 corresponding to each identified temperature 204 may be incremented. In some cases, instead of averaging the counter values 208 at a certain rate, the actuator may select one or more of identified temperatures 204 at a certain rate and the counter values that correspond to the selected identified temperatures 204 may be incremented. However, in this example, after the signal has been sensed and analyzed for 1 sec, 1000 identified temperatures 204 may be recorded. The actuator may then find the average temperature 206 for the 1000 identified temperatures and increment the counter value 208 that corresponds to the average temperature. As shown, in this case, the average temperature is 34.6 and the corresponding $3^{rd}$ row of the counter value column 208 is incremented to 1. Rather than using an average, it is contemplated that the min temperature, maximum temperature, 3 sigma temperature from the standard deviation temperature, and/or any other approach for assigning a temperature representative of the corresponding time period.

Turning to FIG. 2D, which shows the counter table after 24 hours have passed. In this example, 86,400 average temperatures have been calculated. In this case, 23,119 of the average temperatures are in the 50-36 range and 63,281 of the average temperatures are in the 35-11 range. Accordingly, the corresponding counter value 208 in the $2^{nd}$ row has been incremented to 23,119 and the corresponding counter value 208 in the $3^{rd}$ row has been incremented to 63,281. Since an average temperature 206 did not fall within the other actuator temperature ranges, the corresponding counter values 208 remain at 0 for this exemplary 24 hour interval.

Figure 2F:
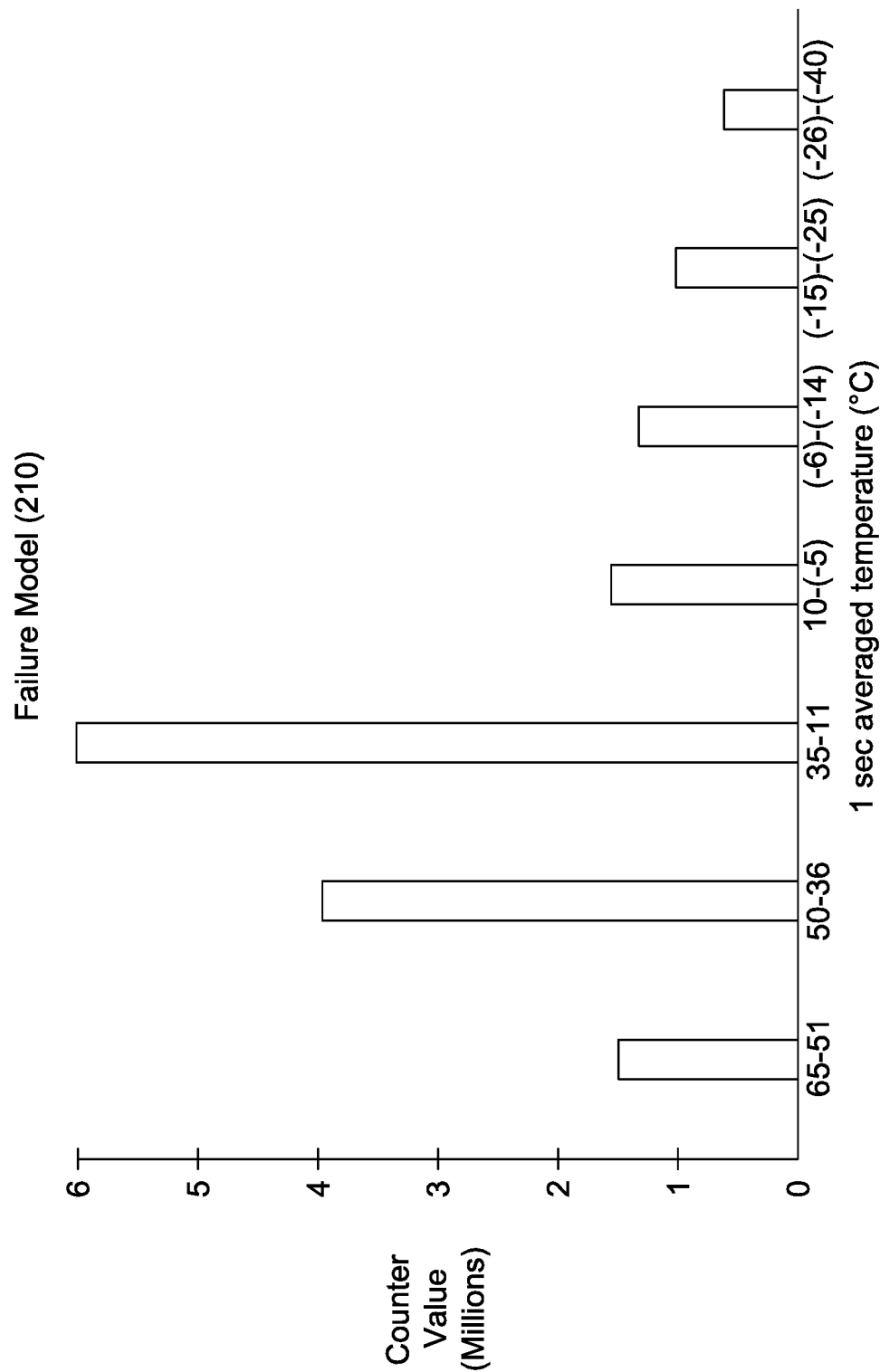
FIG. 2F is a graphical representation of the counter table of FIG. 2E.

Turning to FIG. 2E, which shows the counter table after 6 months have passed. In this example, 15,811,200 average temperatures have been calculated. In this case, 1,503,436 of the average temperatures are in the 65-51 range, 3,964,600 of the average temperatures are in the 50-36 range, 5,952,800 of the average temperatures are in the 35-11 range, 1,611,725 of the average temperatures are in the 10-(−5) range, 1,389,320 of the average temperatures are in the (−4)-(−14) range, 926,213 of the average temperatures are in the (−15)-(−25) range, and 463,106 of the average temperatures are in the (−26)-(−40) range. Accordingly, the corresponding counter value 208 in the 1$^{st}$ row has been incremented to 1,503,436, the corresponding counter value 208 in the 2$^{nd}$ row has been incremented to 3,964,600, the corresponding counter value 208 in the 3$^{rd}$ row has been incremented to 5,952,800, the corresponding counter value 208 in the 4$^{th}$ row has been incremented to 1,611,725, the corresponding counter value 208 in the 5$^{th}$ row has been incremented to 1,389,320, the corresponding counter value 208 in the 6$^{th}$ row has been incremented to 926,213, and the corresponding counter value 208 in the 7$^{th}$ row has been incremented to 463,106 for this exemplary six month interval. FIG. 2F is a graphical representation of the counter table of FIG. 2E.

While FIGS. 2A-2E use a counter table to help explain an illustrative approach for determining and maintaining various counter values, it should be recognized that the actual algorithm implementation may be different. For example, to limit the amount of memory required, all of the identified temperatures 204 need not be stored along with all of the average temperatures 206. Instead, the controller may simply maintain a running average for each average period (1 s) by adding the incoming sensed temperatures during that period to a cumulative value, and then dividing the cumulative value by the total number of incoming sensed temperatures that have been processed during the particular average period. In this implementation, only a cumulative value and a counter of the total number of incoming sensed temperatures that have been processed during the particular average period need be stored in memory. At the end of the particular average period, the resulting average value may be used to increment the appropriate counter value 208. Both the cumulative value and the counter of the total number of incoming sensed temperatures during the particular average period may be reset for use during the next average period.

According to various embodiments, the influence that the identified temperatures 204 have on the operational status of the actuator 100 may be determined. This may be determined by the processing module 104 of the actuator 100, but more preferably by a remote server or the like. For example, a remote server may receive the counter values from many actuators that have failed. The remote server may use this data to determine counter patterns that can help predict when an actuator is likely to fail. From this determination, a failure model (e.g., failure model 138, from FIG. 1) may be created. This failure model may be passed to the actuator 100 or remain on the remote server. In some cases, the actuator and/or remote server may compare the recorded counter values 308 (e.g. from any of the exemplary FIGS. 2C-2E) against the failure model to determine a probability of failure of the actuator over time. In this regard, a user may be provided with the insight into the health or status of the actuator 100, which may allow the user to take the proper course of action so that the building control devices of the building automation system may be replaced before they are projected to fail.

Figure 3A:
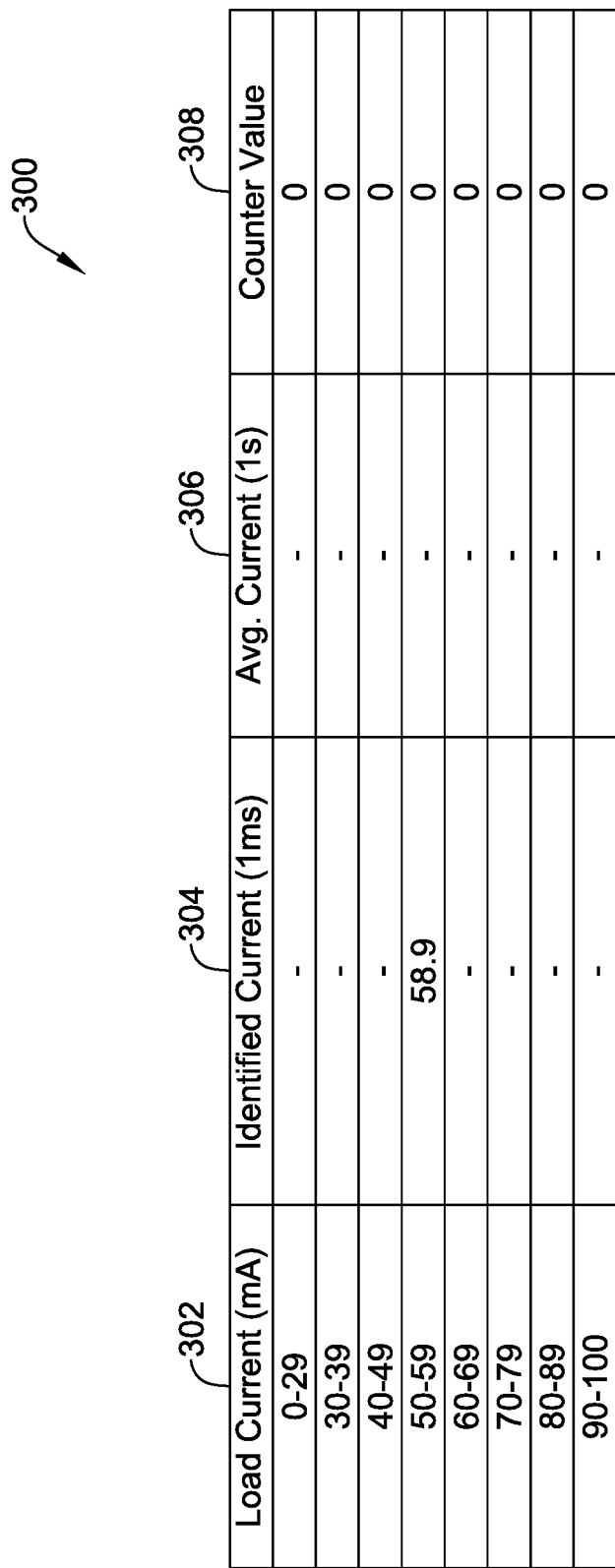

FIG. 3A-3E show another exemplary counter table over time. An exemplary counter table 300 is shown in FIG. 3A. In this example, the parameters are indicative of the operational load current (mA) of the actuator (e.g., actuator 100, from FIG. 1). Accordingly, the signals are continuously sensed (which can include discretely sampled signals at a sample interval) and the load current values are repeatedly identified. As shown, a load current (mA) range 302 of 0 to 100 (mA) may be subdivided into the following load current ranges: 0-29, 30-39, 40-49, 50-59, 60-69, 70-79, 80-89, and 90-100 (mA). In this example, the rate at which signals are sensed (e.g. sampled) is 1 millisecond (ms). In other examples, the rate may be every 1 nanosecond (ns), 1 microsecond (μs), 1 second (s), 5 s, 10 s, 60 s, 1 minute, 10 minutes, 1 hour, 12 hours, 24 hours, or any other suitable time period. In certain embodiments, once the signal has been sensed, the signal may be analyzed to identify the corresponding load current 304. For example, as shown in FIG. 3A, after the first millisecond, the signal is analyzed and the identified load current is 57.2 mA. Since 57.2 mA falls in the range of 50-59, 57.2 is placed in the corresponding 4$^{th}$ row of the identified load current column 304. Turning now to FIG. 3B, after which 10 ms has passed, ten actuator load currents 10 have been identified. In this case, the load currents 57.2, 58.7, and 58.9 are identified and placed in the corresponding 4$^{th}$ row of the identified load current column 304, the load currents 61.3, 63.5, 67.7, and 68.5 are identified and placed in the corresponding 5$^{th}$ row of the identified load current column 304, and the load currents 70.3, 70.6, and 70.2 are identified and placed in the corresponding 6$^{th}$ row of the identified load current column 304.

Turning to FIG. 3C, in this example, the rate at which the identified load currents 304 are averaged is 1 second. In other examples, the rate may be every 1 ns, 1 μs, 1 ms, 5 s, 10 s, 60 s, 1 minute, 10 minutes, 1 hour, 12 hours, 24 hours, or any other suitable rate. In some cases, the identified load currents 304 may not be averaged and the counter values 308 corresponding to each identified load current 304 may be incremented. In some cases, instead of averaging the load currents 304 at a certain rate and incrementing the counter values 308, the actuator may select one or more of identified load currents 304 at a certain rate and the counter values that correspond to the selected identified load currents 304 may be incremented. However, in this example, after the signal has been sensed and analyzed for 1 sec, 1000 identified load currents 304 may be recorded. The actuator may then find the average load current 306 for the 1000 identified load currents and increment the counter value 308 that corresponds to the average load current. As shown, in this case, the average load current is 67.3 and the corresponding 5$^{th}$ row of the counter value column 308 is incremented to 1.

Turning to FIG. 3D, which shows the counter table after 24 hours have passed. As such, in this example, 86,400 average load currents are calculated. In this case, 30,246 of the average load currents are in the 50-59 range, 53,724 of the average load currents are in the 60-69 range, and 12,430 of the average load currents are in the 70-79 range. Accordingly, the corresponding counter value 308 in the 4$^{th}$ row is incremented to 30,246, the corresponding counter value 308 in the 5$^{th}$ row is incremented to 53,724, and the corresponding counter value 308 in the 6$^{th}$ row is incremented to 12,430. Since an average load current did not fall within the other load current ranges, the corresponding counter values 308 remain at 0 for this exemplary 24 hour interval.

Figure 3E:
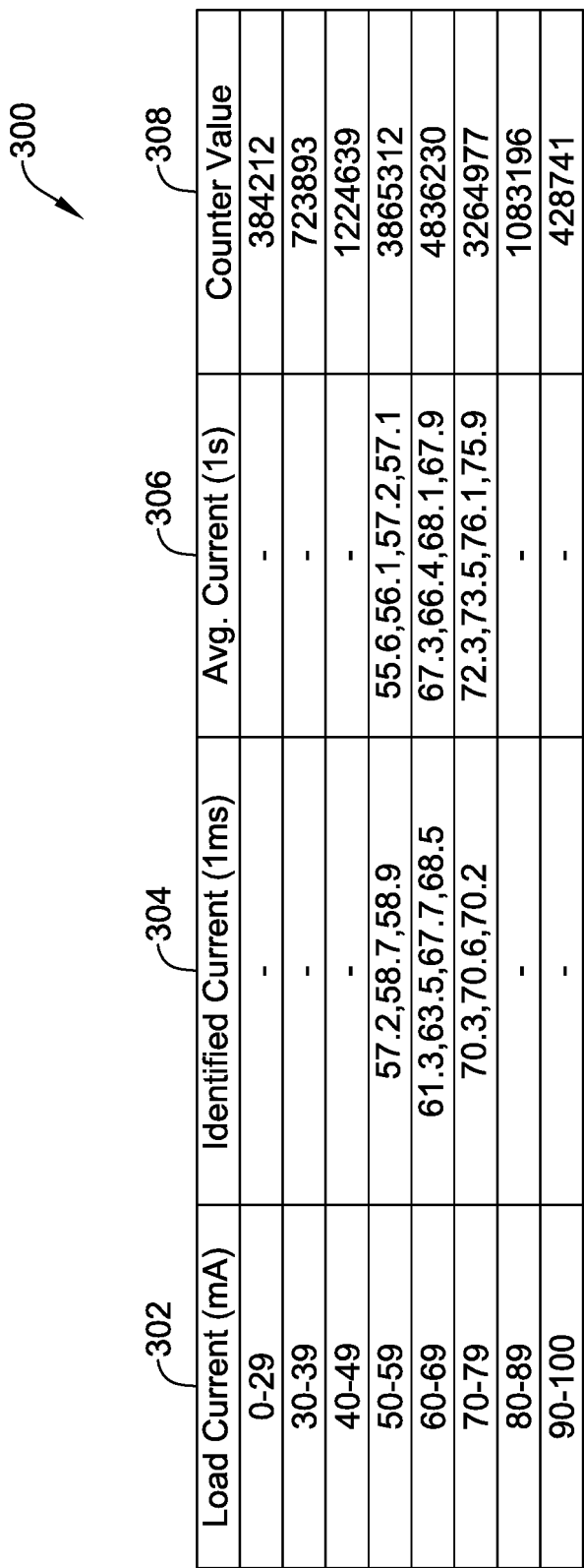
Figure 3F:
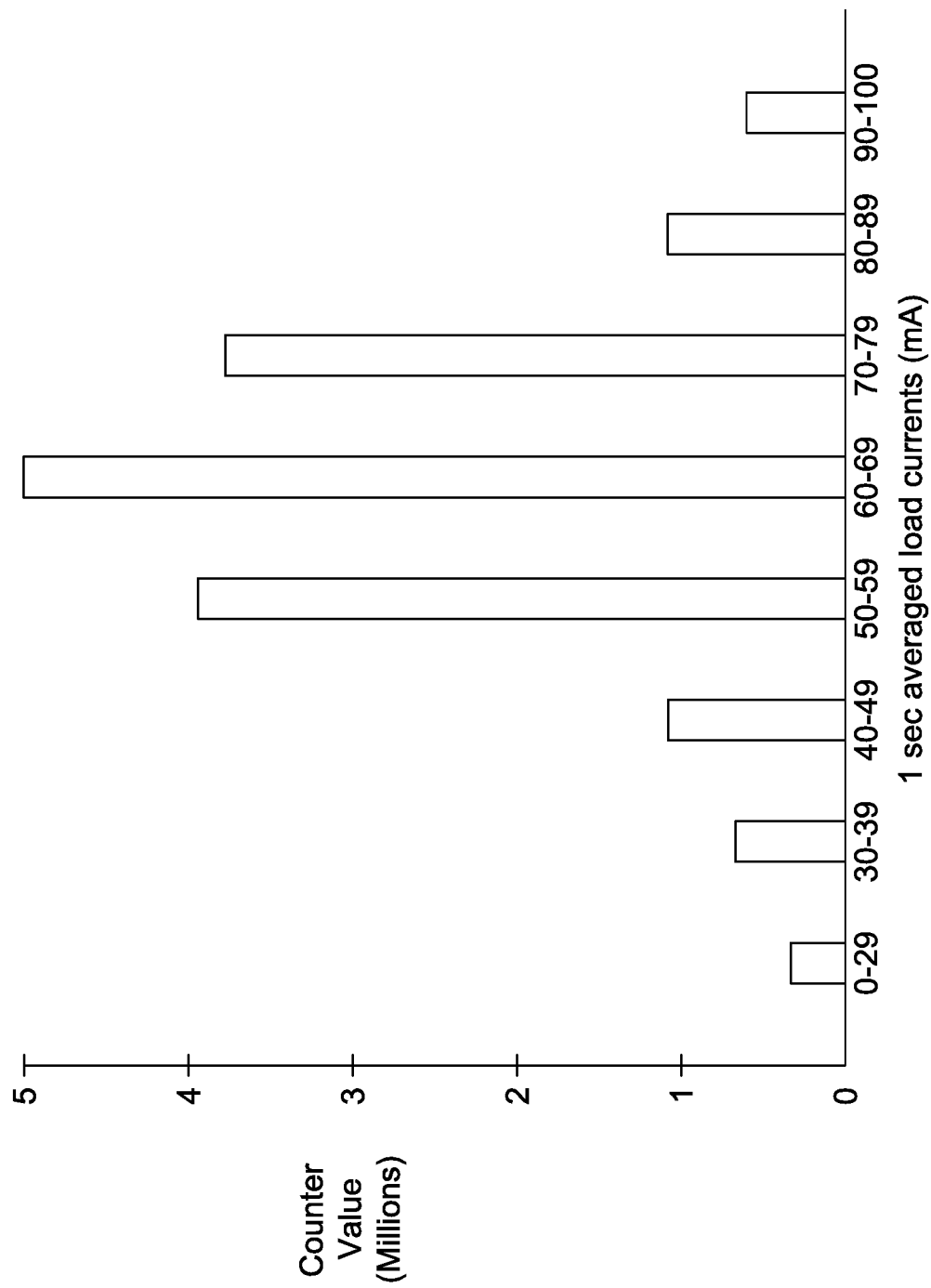
FIG. 3F is a graphical representation of the counter table of FIG. 3E.

Turning to FIG. 3E, which shows the counter table after 6 months have passed. In this example, 15,811,200 average load currents are calculated. In this case, 384,212 of the average load currents are in the 0-29 range, 723,893 of the average load currents are in the 30-39 range, 1,224,639 of the average load currents are in the 40-49 range, 3,865,312 of the average load currents are in the 50-59 range, 4,836,230 of the average load currents are in the 60-69 range, 3,264,977 of the average load currents are in the 70-79 range, 1,083,196 of the average load currents are in the 80-89 range, and 428,741 of the average load currents are in the 90-100 range. Accordingly, the corresponding counter value 308 in the 1st row is incremented to 384,212, the corresponding counter value 308 in the 2nd row is incremented to 723,893, the corresponding counter value 308 in the 3rd row is incremented to 1,224,639, the corresponding counter value 308 in the 4th row is incremented to 3,865,312, the corresponding counter value 308 in the 5th row is incremented to 4,836,230, the corresponding counter value 308 in the 6th row is incremented to 3,264,977, the corresponding counter value 308 in the 7th row is incremented to 1,083,196, and the corresponding counter value 308 in the 8th row is incremented to 428,741 for this exemplary six month interval. FIG. 3F is a graphical representation of the counter table of FIG. 3E.

While FIGS. 3A-3E use a counter table to help explain an illustrative approach for determining and maintaining various counter values, it should be recognized that the actual algorithm implementation may be different. For example, to limit the amount of memory required, all of the identified load currents 304 need not be stored along with all of the average load currents 306. Instead, the controller may simply maintain a running average for each average period (1 s) by adding the incoming sensed load currents during that period to a cumulative value, and then dividing the cumulative value by the total number of incoming sensed load currents that have been processed during the particular average period. In this implementation, only a cumulative value and a counter of the total number of incoming sensed load currents that have been processed during the particular average period need be stored in memory. At the end of the particular average period, the resulting average value may be used to increment the appropriate counter value 308. Both the cumulative value and the counter of the total number of incoming sensed load currents during the particular average period may be reset for use during the next average period.

According to various embodiments, the influence that the identified load currents 304 have on the operational status of the actuator 100 may be determined. This may be determined by the processing module 104 of the actuator 100, but more preferably by a remote server or the like. For example, a remote server may receive the counter values from many actuators that have failed. The remote server may use this data to determine patterns that can help predict when an actuator is likely to fail. From this determination, a failure model (e.g., failure model 138, from FIG. 1) may be created. This failure model may be passed to the actuator 100 or remain on the remote server. In some cases, the actuator and/or remote server may compare the recorded counter values 308 (e.g. from any of the exemplary FIGS. 3C-3E) against the failure model to determine a probability of failure of the actuator over time. In this regard, a user may be provided with the insight into the health or status of the actuator 100, which may allow the user to take the proper course of action so that the building control devices of the building automation system may be replaced before they are projected to fail.

In various embodiments, the actuator may sense multiple signals and increment counter value(s) based on multiple identified parameters. FIG. 4 depicts an exemplary counter table 400 for an actuator that senses signals for parameters indicative of both the actuator (e.g., actuator 100, from FIG. 1) temperature (° C.) and the operational load current (mA) of the actuator. In this example, at a rate of one millisecond, the actuator analyzes the signals to identify the temperature of actuator to determine its corresponding range of temperatures and identifies the load current to determine its corresponding range of load currents. In this example, at a rate of one second, the average temperature for the identified temperatures is found and the average load current for the identified load currents is found. In this example, the actuator may then increment the counter value in the cell (e.g. particular counter) that corresponds to both the average temperature and the average load current for that period. For example, as seen in FIG. 4, cell A shows that 1500 average temperatures of the actuator are found to be in the temperature range of (−25° C.) to (−15° C.) with average load currents in the range of 90-100 mA. Cell B shows that 187500 average temperatures of the actuator are found to be in the temperature range of 36° C. to 50° C. with average load currents in the range of 50-59 mA. Cell C shows that 87500 average temperatures of the actuator are found to be in the temperature range of (−4° C.) to 10° C. with average load currents in the range of 50-59 mA. Each cell in the table 400 may correspond to a counter in counter block 122 of actuator 100. Similar to the examples discussed in regard to FIGS. 2A-2F and 3A-3F, in some cases, the actuator 100 may compare the recorded counter values from table 400 against a failure model to determine a probability of failure of the actuator over time In some cases, the number of open/close cycles of the actuatable output (e.g., the actuatable output 120, from FIG. 1) experienced by the actuator (e.g., actuator 100, from FIG. 1), the number of position changes of the actuatable output experienced by the actuator, the number of stalls of the actuatable output experienced by the actuator, and/or other parameters may be recorded by one or more counters. Such parameters may also be indicative of the status of the surroundings or environment of the actuator and/or the state or operating status of the actuator 100.

In some cases, the actuatable output 120 may stall due to an obstruction in the building control device, dirt/dust buildup, a lack of lubricant and/or change in viscosity of a lubricant due to temperature changes, and/or other causes. A stall may stress the drive motor 118, a drive train such as gear train (not shown) and/or the actuatable output 120, and in some cases, shorten the life of the actuator. In some cases, the speed of the actuatable output 120 at the time of the stall may provide additional information about the potential stress introduced by a stall. As such, the number of stalls of the actuatable output experienced by the actuator, and in some cases, the speed of the actuator at the time of the stall may be captured in one or more counter values. In another example, the number of open/close cycles of the actuatable output may provide a measure of the actual use of the actuator 100. An actuator that is opened/closed hourly will likely fail faster than a similar actuator that is actuated weekly. As a result, the higher the number of open/close cycles, the faster that actuator may be expected to fail.

Since the open/close cycles, the position changes, and/or the number of stalls of the actuatable output experienced by the actuator may vary over time, in some cases, the actuator may repeatedly identify the open/close cycles, the position changes, and the stalls of the actuatable output at a specific rate or rates. The actuator may then analyze the open/close cycles, the position changes, and the stalls of the actuatable output and increment their corresponding counter values accordingly. Also, other conditions (e.g. temperature, etc.) present during each open/close cycle, position change, and/or stall may be recorded in a multi-parameter table similar to that shown in FIG. 4.

Figure 5A:
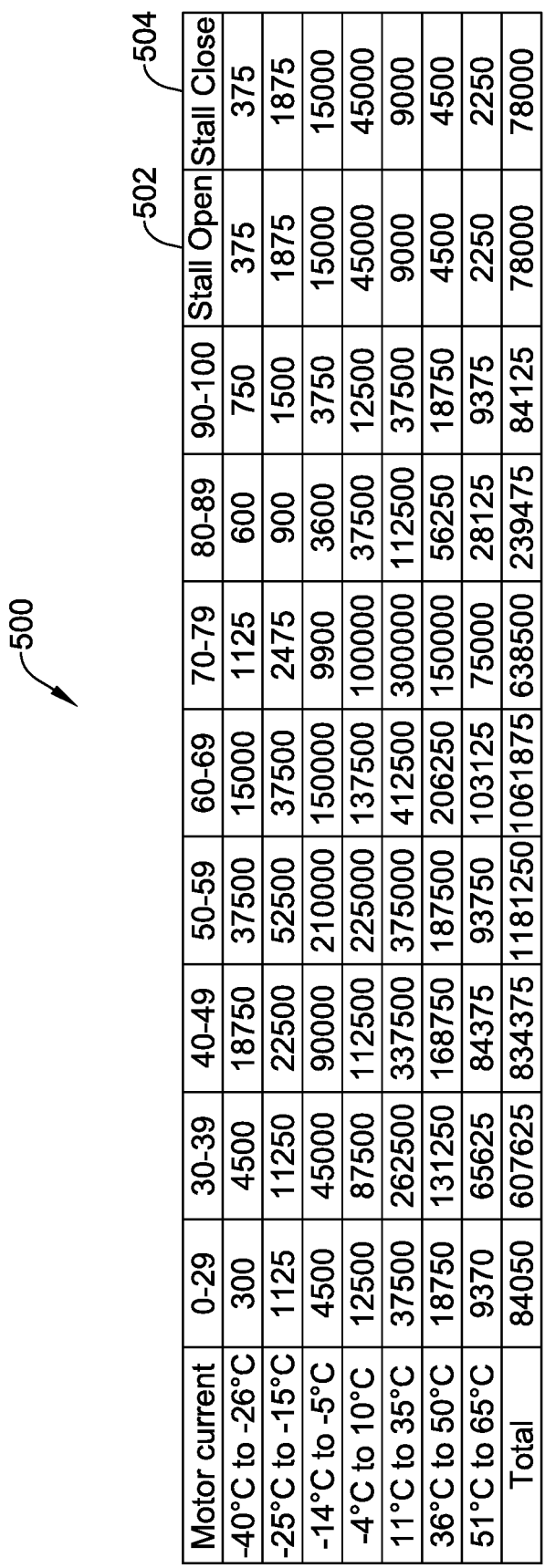
FIG. 5A is another exemplary counter table.

FIG. 5 depicts an exemplary counter table 500 for an actuator that senses signals for parameters indicative of both the actuator (e.g., actuator 100, from FIG. 1) temperature (° C.) and the operational load current (mA) of the actuator.

Figure 5B:
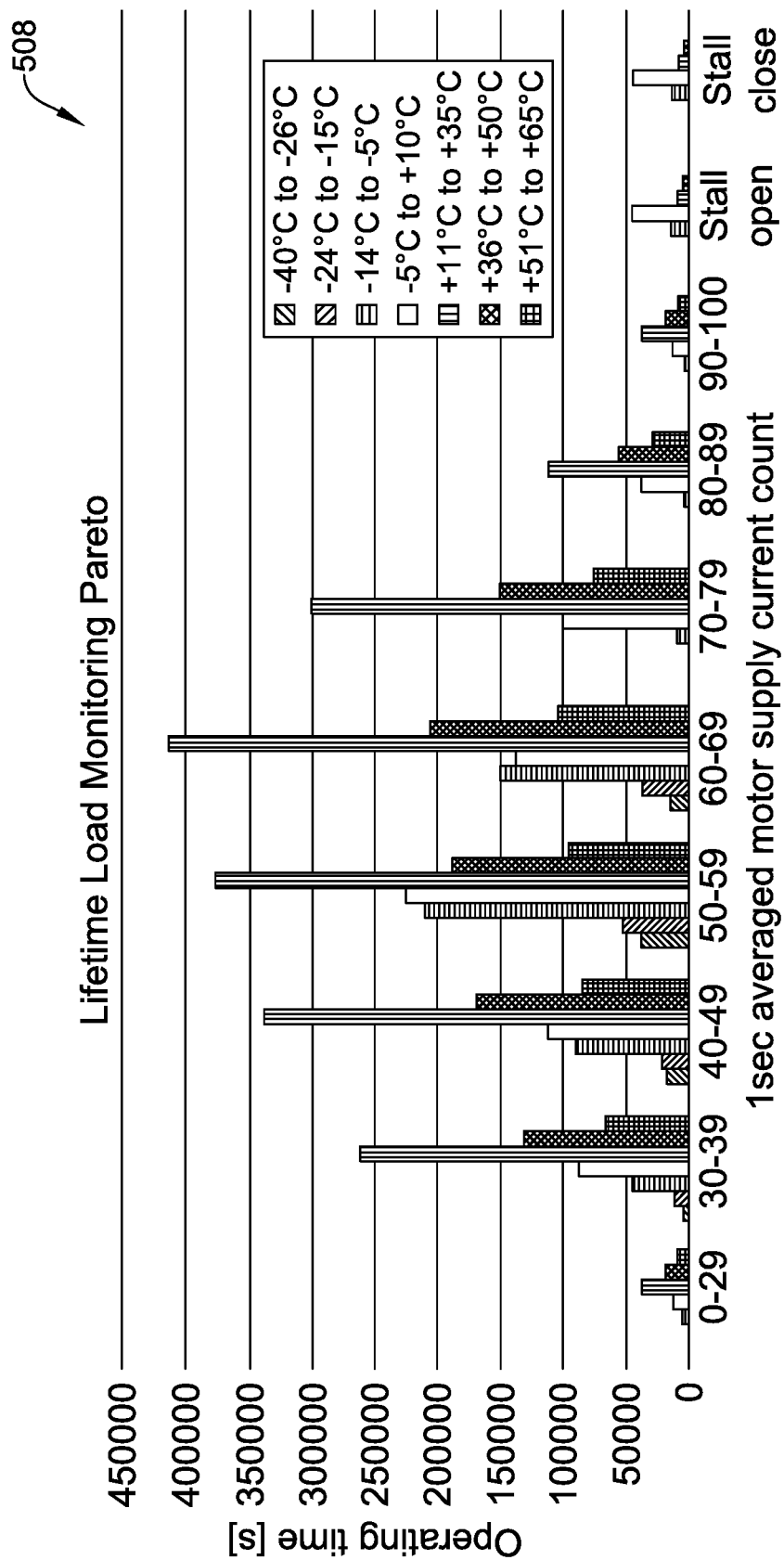
FIG. 5B is a graphical representation of the counter table of FIG. 5A.

The counter table 500 is similar to the counter table 400 of FIG. 4, with the addition of a Stall open column 502, a Stall close column 504, and a Total Cycles counter 506. In certain embodiments, if or when the actuator stalls, the actuator 100 may determine whether the actuatable output is in an open position or a closed position. The actuator may also identify the actuator temperature. Accordingly, the actuator 100 may increment a counter variable for either the Stall open column 502 or the Stall close column 504 in the row that corresponds to the temperature range the includes the identified actuator temperature. Furthermore, in some cases, the actuator may repeatedly increment a Total Cycles counter 506 that records the total open/close cycles over the lifetime of the actuator 100. FIG. 5B is a graphical representation of the counter table of FIG. 5A.

According to various embodiments, the influence that the identified load currents, the identified temperatures, the open/close cycles, and/or the stalls of the actuatable output have on the operational status of the actuator may be determined. From this determination, a failure model (e.g., failure model 138, from FIG. 1) may be created. In some cases, the actuator may measure the recorded counter values from FIG. 5A against the failure model to determine a probability of failure of the actuator over time. This failure model may be passed to the actuator 100 or may be on a remote server. In some cases, the actuator and/or remote server may compare the recorded counter values from FIG. 5A against the failure model to determine a probability of failure of the actuator 100 over time. In this regard, a user may be provided with the insight into the health or status of the actuator 100, which may allow the user to take the proper course of action so that the building control devices of the building automation system may be replaced before they are projected to fail.

Figure 6:
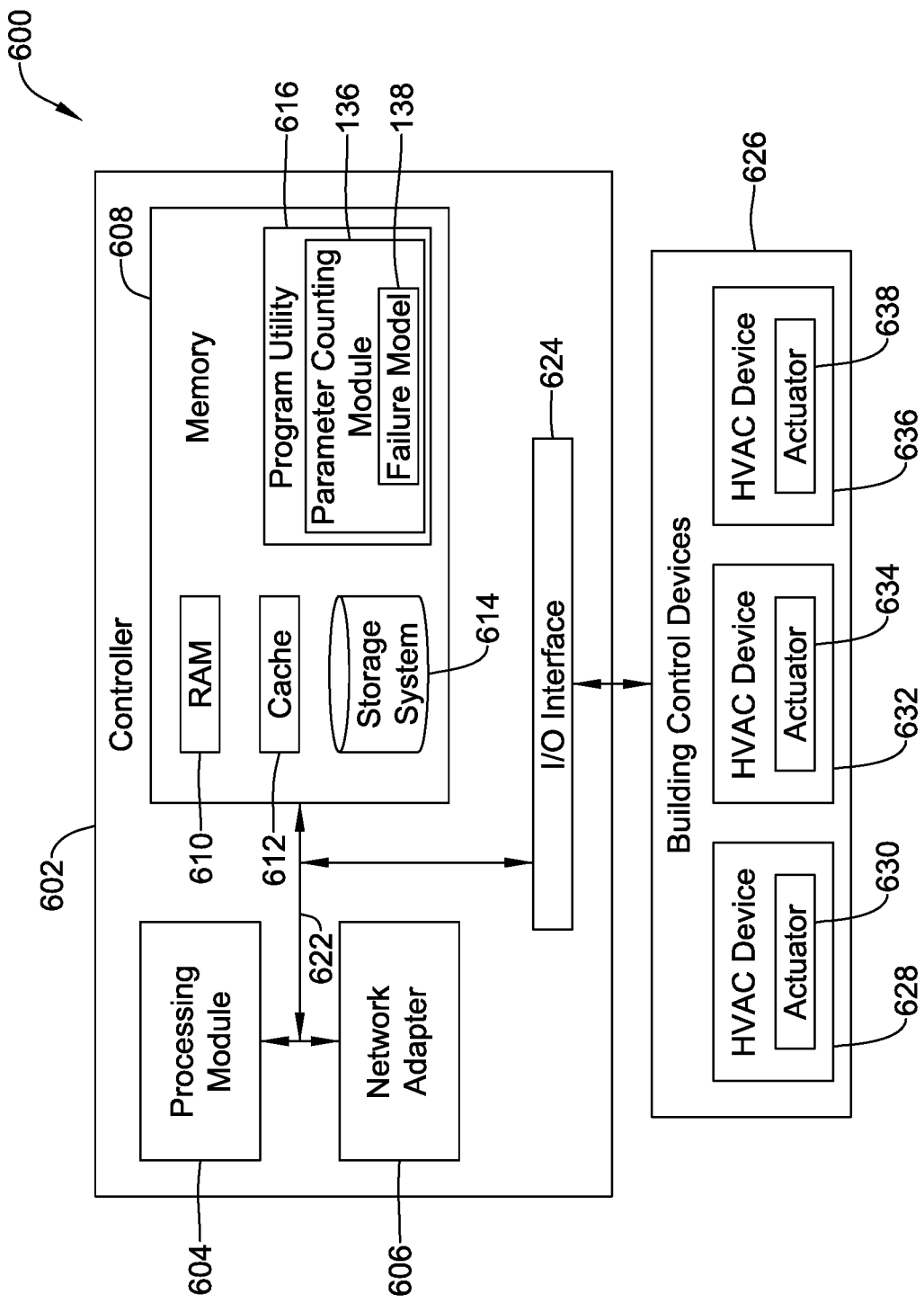
FIG. 6 is a schematic block diagram of an illustrative building control system.

FIG. 6 is a schematic block diagram of an illustrative building automation system 600. In certain embodiments, the building automation system 600 may include a controller 602 and building control devices 626 operatively coupled to the controller 602. As shown, the building control devices 626 may include, but are not limited to, a Heating, Ventilation, and/or Air Conditioning (HVAC) devices 628, 632, and 634. In other embodiments, the building control devices 626 may include more devices, such as security system devices, fire system devices, access control system device, and lighting system devices, for example. In some embodiments, the HVAC devices 628, 632, and 636 may include one or more Air Handing Units (AHU), Variable-Air-Volume (VAV) units, dampers, valves, fans, heating units, cooling units, sensors, thermostats, humidifiers, dehumidifiers etc., which allow for the monitoring and/or control of temperature and/or other environmental conditions in a building.

In the example shown, the controller 602 can perform various communication and data transfer functions and can execute one or more application functions. The components of controller 602 may include, but are not limited to, a processing module 604, memory 608, and a bus 622 that couples various system components including the memory 608 to the processing module 604. The processing module 604 may execute instructions stored in the memory 608. Moreover, the processing module 604 and the memory 608 may be configured similar to the processing module 104 and the memory 112 of the actuator 100 described with respect to FIG. 1. According to various embodiments, the processing module 604 and the memory 608 may have additional functionality and storage capacity as desired to facilitate proper management of the building control devices 626 and communication with external device (e.g., HVAC devices 628, 632, 636 and a server). The controller 602 may be part of a remote server.

The memory 608 can include computer system readable media in the form of volatile memory, such as random access memory (RAM) 610 and/or cache memory 612. Controller 602 may further include other removable/non-removable, volatile/non-volatile computer system storage media. By way of example only, storage system 614 can be provided for reading from and writing to a non-removable, non-volatile magnetic media (not shown and typically called a "hard drive").

Similar to program/utility 134 of FIG. 1, program/utility 616 may be stored in the memory 608 and may include a set of application program modules (e.g. software), such as the parameter counter module 136. In some cases, the program/utility 616 may include additional program modules as well as an operating system, one or more other application program modules, and program data. According to various embodiments, the application program modules (e.g., the parameter counter module 136) may include the actuator failure model 138, for example. In certain embodiments, the parameter counter module 136, including the actuator failure model 138, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The parameter counter module 136 may execute on the controller 602. In some cases, the parameter counter module 136 may execute on a remote device (e.g., actuators 630, 634, or 638 or a server). In some cases, part of the parameter counter module 136 may be executed on the controller 602 and part of the parameter counter module 136 may be executed on a remote device. In the latter scenario, the controller 602 may be connected to the remote device, such as the building control devices 626, through any type of network, including a local area network (LAN) or a wide area network (WAN), or the connection may be made to an external computer (for example, through the Internet using an Internet Service Provider). In certain instances, a network adapter 606 is include in the controller 602 to support such communication.

In various embodiments, the controller 602 may communicate with one or more devices such as the building control devices 626 and thus, the actuators 630, 634, and 638 via Input/Output (I/O) interface(s) 624. In some cases, the building control device 626 building may be managed by the controller 602. In certain embodiments, the controller 602 may use the processing module 604 to send control instructions to the building control device 626. For instance, the processing module 604 may be operatively coupled to I/O interface(s) 624 via the bus 622, and may use the I/O interface 624 to communicate with the actuators 630, 634, and 638 of the building control devices 626.

In some cases, the I/O interface 624 may be connected to the building control devices 626 through a wired or wireless network, and in some cases may communicate with building control devices 626 using one or more communication protocol. For example, in certain embodiments, the I/O interface 624 may communicate with the HVAC devices 628, 632, and 636 through serial and/or parallel communication using building automation protocols over a BACnet. This is just one example of building control network protocols that may be used to facilitate communication between the controller 602 and the building control devices 626. Other building control network protocols that are contemplated include, but are not limited to, 1-Wire, C-Bus, CC-Link Industrial Networks, DSI, Dynet, KNX, LonTalk, oBIX, VSCP, xAP, X10, Z-Wave, ZigBee, INSTEON, TCIP, and/or Ethernet.

In certain embodiments, the I/O interface 624 may be configured to communicate with the actuators 630, 632, and 634 to send and/or receive diagnostic information (e.g., counter value(s), a failure model 138, and/or a probability of failure of the actuator) to and from the actuators 630, 632, and 634 and/or other information regarding the actuators 630, 632, and 634. For example, in some cases, the actuators 630, 632, and 634 may receive information, such as, the failure model 138 in the form of signals, data, commands or instructions and/or messages from the controller 602 through the I/O interface 624. The actuators 630, 632, and 634 may send current counter value(s), an updated failure model 138, and/or a probability of failure to the controller 602 through the I/O interface 624. The controller 602 may use the processing module 604 to organize and/or combine the data from a plurality of actuators (e.g., actuators 630, 634, and 638) to produce more accurate failure models that can be used to diagnose the overall operating status for the actuators 630, 634, and 638 and/or other actuators. In some cases, the controller 602 may be operated by the manufacturer of the actuators, and may receive data, and the controller 602 may receive the counter values from many actuators in the field as they fail. These actuators may be installed throughout the country or world at various customer sites. The controller 602 may use this data to determine counter patterns that can help predict when an actuator is likely to fail. From this determination, a failure model (e.g., failure model 138, from FIG. 1) may be created and/or updated by the controller 602. In some cases, an updated failure model may be downloaded to the actuators, such as to actuators 630, 634 and 638.

Figure 7:
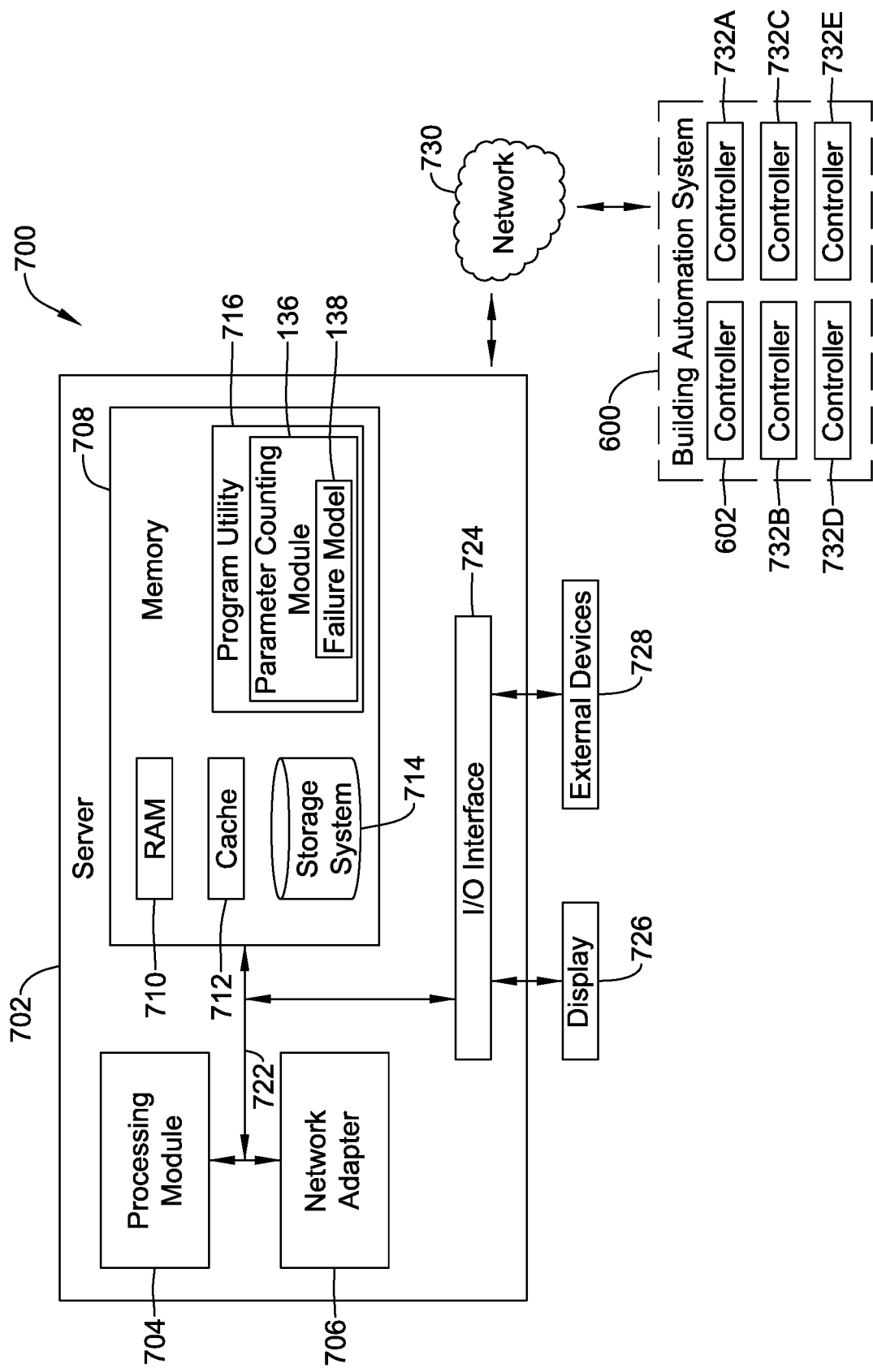
FIG. 7 is a schematic block diagram of another illustrative building control system.

FIG. 7 is a schematic block diagram of another illustrative building control system 700. In certain embodiments, the building control system 700 may include a server 702 and the building automation system 600. As shown, the building automation system 600 includes the controller 602, from FIG. 6, and several additional controllers 732A-732E. The controllers 602 and 732A-732E are exemplary devices that each provide a building control function. Each of the controllers 602 and 732A-732E may include suitable logic, circuitry and/or code for storing one or more parameters associated with the operation of corresponding building control devices (e.g., the building control devices 626, from FIG. 6). In various embodiments, the controllers 732A-732E may control devices of an HVAC system, a security system, a fire system, an access control system, and a lighting system, for example. In some cases, the devices of a security system may include, sensors, alarm devices, audio/visual devices, lights, contact sensors for monitoring the state of doors and windows, security card pass systems, electronic locks, etc. In some cases, the devices of a fire system may include smoke/heat sensors, a sprinkler system, warning lights, etc. In some cases, the devices of an access control system may include doors, door locks, windows, window locks, turnstiles, parking gates, elevators, or other physical barrier, where granting access can be electronically controlled. In some cases, the devices of a lighting system may include emergency lights, outlets, lighting, drapes, and general load switching, some of which are subject to "dimming" control which varies the amount of power delivered to the various building control devices. These are just a few examples of building control devices. In some cases, the building control devices may also include low voltage devices that may include, but are not limited to, garage door openers, lawn sprinklers, exterior lights, and pool/spa heaters (controlled via a relay or the like).

In some cases, the building automation system 600 may be managed or controlled using the server 702 that is operatively connected to the controllers 602 and 732A-732. In some cases, the server 702 may be operatively connected to the building automation system 600 through a wired or wireless network 730. In some examples, the network 730 may be a local area network (LAN), a general wide area network (WAN), and/or a public network (e.g., the Internet). Furthermore, in some cases, the network 730 may comprise copper transmission cables, optical transmission fibers, wireless transmission, routers, firewalls, switches, gateway computers and/or edge servers. In certain instances, a network adapter is included in the server 702 (e.g., the network adapter 706) and/or a network adapter (not shown) is included with each controller (e.g., the network adapter 606) to support communication. In some cases, the building automation system 600 includes the server 702.

As shown in FIG. 7, the server 702 may be in the form of a general-purpose computing system, but this is not required. In some cases, the server 702 may be a special purpose computing system. The components of the server 702 may include, but are not limited to, one or more processors or processing modules 704, memory 708, and a bus 722 that couples various system components including system memory 708 to the processing module 704. The processing module 704 and the memory 708 may be configured similar to the processing module 604 and the memory 608 of the controller 602 described with respect to FIG. 6. For instance, program/utility 716 may be stored in the memory 708 and may include a set of application program modules (e.g. software), such as the parameter counter module 136. In some cases, the program/utility 716 may include additional program modules as well as an operating system, one or more other application program modules, and program data. According to various embodiments, the application program modules (e.g., the parameter counter module 136) may include an actuator failure model 138, for example. In certain embodiments, the parameter counter module 136, including the actuator failure model 138, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The parameter counter module 136 may execute on the server 702. In some cases, the parameter counter module 136 may execute on a remote device (e.g., actuators 630, 634, or 638, from FIG. 6, or controllers 602 and 732A-732E of FIG. 7). In some cases, part of the parameter counter module 136 may be executed on the server 702 and part of the parameter counter module 136 may be executed on a remote device. In the latter scenario, the server 702 may be connected to the remote device, such as the controllers 602 and 732A-732E through any type of network (e.g., network 730) and communicate information regarding the parameter counter module 136 over the network. For example, in some cases, the server 702 may communicate with one or more of the controllers 602 and 732A-732E and thus, the actuators controlled by the controllers 602 and 732A-732E via the network 730. In certain embodiments, the server 702 may use the processing module 704 to send control instructions to the building automation system 600. For instance, the processing module 704 may be operatively coupled to the network adapter 706 via the bus 722, and may use the network adapter 706 to communicate over the network 730 to the actuators (e.g., 630, 634, and 638, from FIG. 6) of the building automation system 600.

In certain embodiments, the network adapter 706 may be configured to communicate over the network 730 with the controllers 602 and 732A-732E and/or the actuators to receive and provide diagnostic information (e.g., counter value(s), the failure model 138, a probability of failure of the actuators) to and from the controllers 602 and 732A-732E and/or actuators. For example, in some cases, the actuators may receive information, such as, the failure model 138 in the form of signals, data, commands or instructions and/or messages from the server 702. The actuators may send current counter value(s), an updated failure model 138, and/or a probability of failure to the server 702. The server 702 may use the processing module 604 to organize and combine the data from all of the actuators in the building automation system 600 (including data from all the controllers 602 and 732A-732E of the building automation system 600) to produce more accurate failure models that can be used to diagnose the overall operating status for the actuators 630, 634, and 638 and/or other actuators.

In various embodiments, the server 702 may communicate the probability of failure of the actuators of the building automation system 600 with one or more external devices 728 and/or a display 726. The one or more external devices 728 and the display 726 may enable a user to interact with the server 702, and/or may enable the server 702 to communicate with one or more other computing devices. In some cases, the server 702 may output a maintenance schedule that indicated an estimated date of failure of each of the actuators. Maintenance personnel may then replace the actuators just before their corresponding projected date of failure. This communication can occur via Input/Output (I/O) interface(s) 724.

FIG. 8 shows an example method 800 for estimating a probability of failure of an actuator. Method 800 begins at step 802, where the actuator senses a first sensed parameter in or around the actuator that has a first sensed parameter value that can change with time. In some examples, the first sensed parameter values may be indicative of the status of the surroundings or environment of the actuator and/or the operating status of the actuator. For example, the first sensed parameter values may include values regarding the operational load current of the actuator, the internal temperature of the actuator, the temperature surrounding the actuator, the humidity levels surrounding the actuator, the atmospheric pressure surrounding the actuator, the differential pressure within the actuator, the speed and direction of the air surrounding the actuator, the quality of the air surrounding the actuator, etc. Since the actuators surroundings and the actuators operating status may change over time, the first sensed parameter values may also change over time. At step 804, the actuator may repeatedly identify a first identified value representative of the first sensed parameter value. The first identified value may be a sensed value, a max value over a predefined interval, a minimum value over a predefined interval, an average of the sensed values over a predefined interval, or any other value representative of the first sensed parameter value. At step 806, for each first identified value, the actuator may increment a first counter value when the first identified value falls within a first range of values, and increment a second counter value when the first identified value falls within a second range of values, and the first range of values may be different from the second range of values. At step 808, the actuator may calculate the probability of failure of the actuator based at least in part on the first counter value and/or the second counter value. In some cases, the influence the first sensed parameter has over the operating condition of the actuator may be determined. From this determination, a failure model may be created. In some cases, the actuator may measure the first counter value and/or second counter value against the failure model to determine the probability of failure of the actuator. The method 800 may then return to step 802.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Also, in the above description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description as examples or embodiments, with each claim standing on its own as a separate embodiment, and it is contemplated that such embodiments can be combined with each other in various combinations or permutations.

What is claimed is:

1. An actuator for actuating a building control device of a building automation system, the actuator comprising:
    a drive motor;
    an actuatable output coupled to and driven by the drive motor;
    a first sensor for sensing a first sensed parameter in or around the actuator, wherein the first sensed parameter has a first sensed parameter value that can change with time; and
    electronics operatively coupled to the first sensor, the electronics configured to:
      repeatedly identify a first identified value representative of the first sensed parameter value;
      for each first identified value, increment a first counter value when the first identified value falls within a first range of values, and increment a second counter value when the first identified value falls within a second range of values, wherein the first range of values is different from the second range of values.

2. The actuator of claim 1, wherein the electronics is configured to identify a first identified value representative of the first sensed parameter value at a first predetermined rate.

3. The actuator of claim 2, wherein the electronics is configured to sample the first sensor for the first sensed parameter value at a second predetermined rate, wherein the second predetermined rate is faster than the first predetermined rate.

4. The actuator of claim 3, wherein the electronics is configured to identify a first identified value by averaging the first sensed parameter values that have been sampled since the last first identified value was identified.

5. The actuator of claim 3, wherein the electronics is configured to identify a first identified value by selecting one of the first sensed parameter values that have been sampled since the last first identified value was identified.

6. The actuator of claim 1, further comprising:
a second sensor for sensing a second sensed parameter in or around the actuator, wherein the second sensed parameter has a second sensed parameter value that can change with time; and
the electronics is further configured to:
repeatedly identify a second identified value representative of the second sensed parameter value;
for each first identified value, increment a third counter value when the second identified value falls within a third range of values, and increment a fourth counter value when the second identified value falls within a fourth range of values, wherein the third range of values is different from the fourth range of values.

7. The actuator of claim 6, wherein the first sensor is a temperature sensor, and the second sensor is a load current sensor.

8. The actuator of claim 1, wherein the electronics is further configured to calculate a probability of failure of the actuator based at least in part on the first counter value and the second counter value.

9. The actuator of claim 8, further comprising a receiver for receiving a failure model from a remote device, wherein the electronics is configured to use the failure model to calculate the probability of failure of the actuator.

10. The actuator of claim 1, wherein the first identified value representative of the first sensed parameter value is the first sensed parameter value.

11. The actuator of claim 1, further comprising a transmitter for transmitting the first counter value and the second counter value to a remote device.

12. The actuator of claim 1, wherein the electronics is further configured to increment a stall counter for maintaining a count of a number of stalls experienced by the actuator.

13. The actuator of claim 1, wherein the electronics is further configured to increment a cycle counter for maintaining a count of a number of open/close cycles and/or number of position changes of the actuatable output experienced by the actuator.

14. An actuator for actuating a building control device of a building automation system, the actuator comprising:
a drive motor;
an actuatable output coupled to and driven by the drive motor;
a first sensor for sensing a first sensed parameter in or around the actuator, wherein the first sensed parameter has a first sensed parameter value that can change with time, wherein the first sensor is a temperature sensor and the first sensed parameter is a sensed temperature; and
electronics operatively coupled to the first sensor, the electronics configured to:
repeatedly identify a first identified value representative of the first sensed parameter value;
for each first identified value, increment a first counter value when the first identified value falls within a first range of values, and increment a second counter value when the first identified value falls within a second range of values, wherein the first range of values is different from the second range of values.

15. The actuator of claim 14, wherein the electronics is configured to identify a first identified value representative of the first sensed parameter value at a first predetermined rate.

16. The actuator of claim 15, wherein the electronics is configured to sample the first sensor for the first sensed parameter value at a second predetermined rate, wherein the second predetermined rate is faster than the first predetermined rate.

17. The actuator of claim 16, wherein the electronics is configured to identify a first identified value by averaging the first sensed parameter values that have been sampled since the last first identified value was identified.

18. The actuator of claim 16, wherein the electronics is configured to identify a first identified value by selecting one of the first sensed parameter values that have been sampled since the last first identified value was identified.

19. The actuator of claim 14, further comprising:
a second sensor for sensing a second sensed parameter in or around the actuator, wherein the second sensed parameter has a second sensed parameter value that can change with time; and
the electronics is further configured to:
repeatedly identify a second identified value representative of the second sensed parameter value;
for each first identified value, increment a third counter value when the second identified value falls within a third range of values, and increment a fourth counter value when the second identified value falls within a fourth range of values, wherein the third range of values is different from the fourth range of values.

20. The actuator of claim 19, wherein the second sensor is a load current sensor.

21. The actuator of claim 14, wherein the electronics is further configured to calculate a probability of failure of the actuator based at least in part on the first counter value and the second counter value.

22. The actuator of claim 21, further comprising a receiver for receiving a failure model from a remote device, wherein the electronics is configured to use the failure model to calculate the probability of failure of the actuator.

23. The actuator of claim 14, wherein the first identified value representative of the first sensed parameter value is the first sensed parameter value.

24. The actuator of claim 14, further comprising a transmitter for transmitting the first counter value and the second counter value to a remote device.

25. The actuator of claim 14, wherein the electronics is further configured to increment a stall counter for maintaining a count of a number of stalls experienced by the actuator.

26. The actuator of claim 14, wherein the electronics is further configured to increment a cycle counter for maintaining a count of a number of open/close cycles and/or number of position changes of the actuatable output experienced by the actuator.

27. An actuator for actuating a building control device of a building automation system, the actuator comprising:
a drive motor;
an actuatable output coupled to and driven by the drive motor;
a first sensor for sensing a first sensed parameter in or around the actuator, wherein the first sensed parameter has a first sensed parameter value that can change with time, wherein the first sensor is a temperature sensor and the first sensed parameter is a sensed temperature;
a second sensor for sensing a second sensed parameter in or around the actuator, wherein the second sensed parameter has a second sensed parameter value that can change with time, wherein the second sensor is a load current sensor and the second sensed parameter is a measure of load current to the drive motor; and
electronics operatively coupled to the first sensor and the second sensor, the electronics configured to:
repeatedly identify a first identified value representative of the first sensed parameter value;
repeatedly identify a second identified value representative of the second sensed parameter value;
increment a first counter value when the first identified value falls within a first range of values and the second identified value falls within a second range of values;
increment a second counter value when the first identified value falls within a third range of values and the second identified value falls within the second range of values;
increment a third counter value when the first identified value falls within the first range of values and the second identified value falls within a fourth range of values;
increment a fourth counter value when the first identified value falls within the second range of values and the second identified value falls within the fourth range of values; and
use one or more of the first counter value, the second counter value, the third counter value and the fourth counter value to provide an indication of when the actuator should be replaced.

28. The actuator of claim 27, wherein the electronics is further configured to calculate a probability of failure of the actuator based at least in part on the first counter value, the second counter value, the third counter value and the fourth counter value.

29. The actuator of claim 28, further comprising a receiver for receiving a failure model from a remote device, wherein the electronics is configured to use the failure model to calculate the probability of failure of the actuator.

30. The actuator of claim 27, wherein the electronics is configured to identify a first identified value representative of the first sensed parameter value, identify a second identified value representative of the second sensed parameter value, and increment the first, second, third and fourth counter values, as appropriate, at a predetermined rate.

31. The actuator of claim 27, further comprising a transmitter for transmitting the first counter value, the second counter value, the third counter value and the fourth counter value to a remote device.

32. An actuator for actuating a building control device of a building automation system, the actuator comprising:
a drive motor;
an actuatable output coupled to and driven by the drive motor;
a first sensor for sensing a first sensed parameter in or around the actuator, wherein the first sensed parameter has a first sensed parameter value that can change with time;
a second sensor for sensing a second sensed parameter in or around the actuator, wherein the second sensed parameter has a second sensed parameter value that can change with time; and
electronics operatively coupled to the first sensor and the second sensor, the electronics configured to:
repeatedly identify a first identified value representative of the first sensed parameter value;
repeatedly identify a second identified value representative of the second sensed parameter value;
increment a first counter value when the first identified value falls within a first range of values and the second identified value falls within a second range of values;
increment a second counter value when the first identified value falls within a third range of values and the second identified value falls within the second range of values;
increment a third counter value when the first identified value falls within the first range of values and the second identified value falls within a fourth range of values; and
increment a fourth counter value when the first identified value falls within the second range of values and the second identified value falls within the fourth range of values.

33. The actuator of claim 32, wherein the electronics is configured to identify a first identified value representative of the first sensed parameter value, identify a second identified value representative of the second sensed parameter value, and increment the first, second, third and fourth counter values, as appropriate, at a predetermined rate.

34. A method for estimating a probability of failure of an actuator, comprising:
sensing a first sensed parameter in or around the actuator, wherein the first sensed parameter has a first sensed parameter value that can change with time;
repeatedly identifying a first identified value representative of the first sensed parameter value;
for each first identified value, incrementing a first counter value when the first identified value falls within a first range of values, and incrementing a second counter value when the first identified value falls within a second range of values, wherein the first range of values is different from the second range of values; and
calculating a probability of failure of the actuator based at least in part on the first counter value.

* * * * *